United States Patent [19]

Coles et al.

[11] Patent Number: 5,204,102

[45] Date of Patent: Apr. 20, 1993

[54] ANIMAL FEEDSTUFF

[75] Inventors: Richard G. Coles; Ian J. Broadfoot, both of Toowoomba, Australia

[73] Assignee: Grainco Queensland Co-Operative Association Limited, Queensland, Australia

[21] Appl. No.: 753,905

[22] Filed: Sep. 3, 1991

[30] Foreign Application Priority Data

Jan. 14, 1991 [AU] Australia .................... PK4194

[51] Int. Cl.$^5$ ...................... A61K 35/78; A23L 1/20
[52] U.S. Cl. ................... 424/195.1; 426/630; 426/807
[58] Field of Search .............. 424/195.1; 426/630, 426/807

[56] References Cited

PUBLICATIONS

Chem. Abst. Gega et al., 77:4039g, 1972.
Chem. Abst. Bindra, 84: 88018e, 1976.

Primary Examiner—John W. Rollins
Attorney, Agent, or Firm—Nixon & Vanderhye

[57] ABSTRACT

An animal feedstuff comprising fluffy cotton seed coated with a binder selected from molasses, gum, starch and lignasite in an amount of 1–10% by weight, a filler selected from calcium carbonate, diatomaceous earth, bentonite, lime, kaolin, extruded and textured proteins, ground cereal grains and mixtures thereof in an amount of 10–50% by weight, and animal maintenance additives selected from vitamins, minerals, trace elements, veterinarian products for the prevention, control or eradication of disease, and growth stimulating factors in an amount of 0–5% by weight.

22 Claims, 1 Drawing Sheet

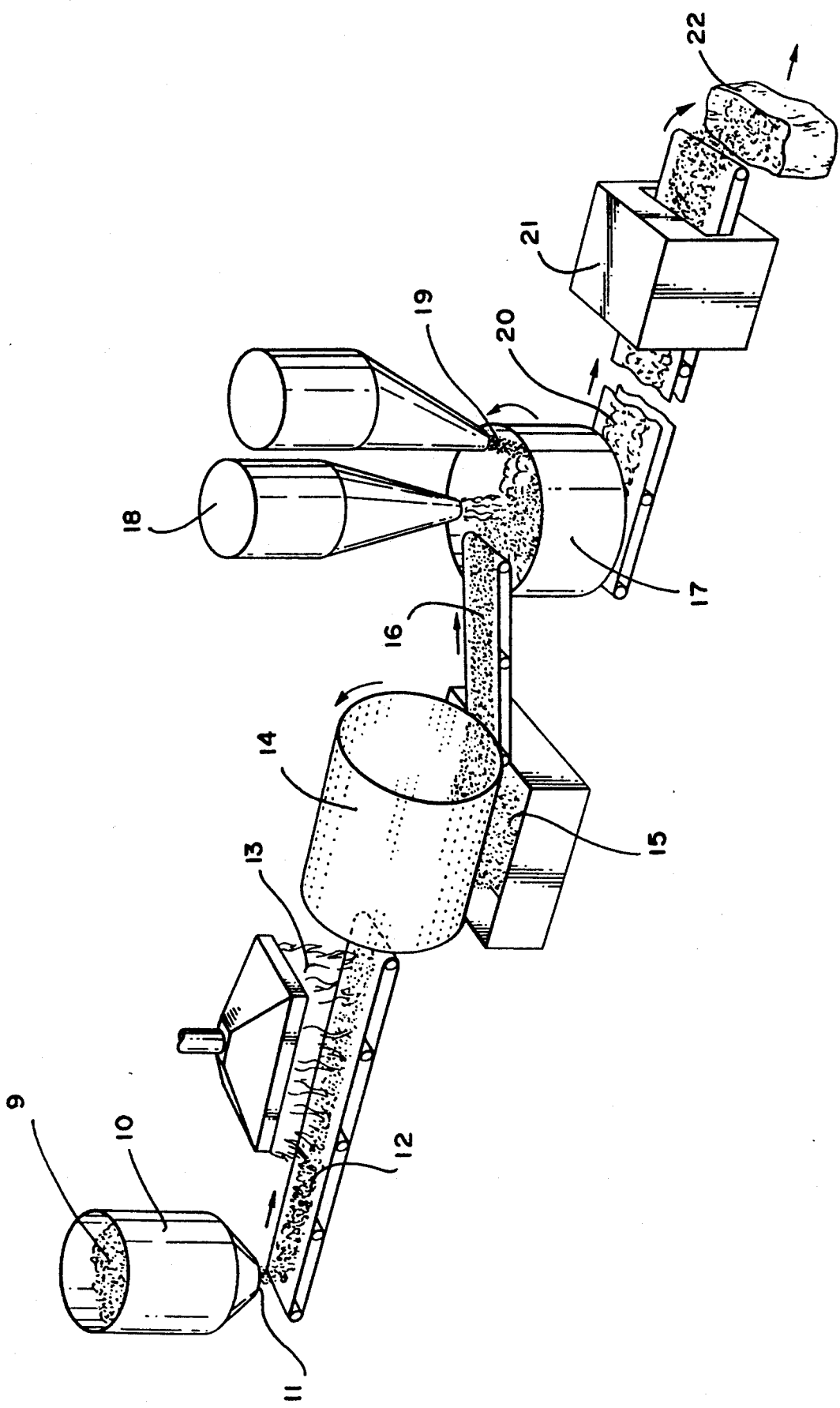

ANIMAL FEEDSTUFF

BACKGROUND OF THE INVENTION

This invention relates to animal feedstuffs and is particularly concerned with providing a useful feedstuff from fluffy cotton seed.

Fluffy cotton seed is cotton seed which includes a quantity of adherent cotton fibres and is the product left over after the main cotton ball has been removed by ginning. It is produced in large amounts and is generally a waste product. However, because of its high nutrient quality, it has been considered for use as an animal feed supplement and in this context has been used by dairy farms.

The use of fluffy cotton seed for large scale feeding of a wide range of animals would be highly desirable but this has generally been negated due to the tendency of the cotton fibrils of neighbouring seeds to tangle with one another to form large masses resulting in difficulties in bulk handling, particularly the flowability of the product. As a means around this problem, delinting has been proposed by mechanical or chemical means but this added expense has generally negated the commercial viability of the product as an inexpensive feedstuff.

It is therefore an object of the present invention to obviate this disadvantage and to simultaneously provide a feedstuff which is highly nutritive and acceptable to animals.

SUMMARY OF THE INVENTION

According to the broadest aspect of the present invention, there is provided an animal feedstuff comprising a fluffy cotton seed, as herein defined, coated with a binder and filler.

The term "fluffy cotton seed" is defined as the remnant seed portion of the cotton boll after ginning.

DETAILED DESCRIPTION OF THE INVENTION

Preferably, the fluffy cotton seed is partially delinted prior to coating by singeing in an open flame. Such singeing may be such as to remove up to about 50% of the cotton which will reduce the total weight of the fluffy cotton seed by about 5%. The charcoal which is produced during such singeing may be removed by abrasion such as passing the flame delinted seed through a buffing trommel. Rotation of the trommel during passage of the seed causes the charcoal to abrade away and pass through the openings in the trommel wall.

Partially delinted cotton seed is preferred as it prevents any possibility of agglomeration between seeds having long cotton fibrils during the coating process.

The nature of the binder and filler will primarily be determined by the particular type of animal the feedstuff is required for and whether the feedstuff is intended only as a supplement or as a complete food. Other additives may also be included to meet specific animal maintenance requirements.

The main functions of the binder are to cement the adherent cotton fibres to the seed and to act as a cementatious base to which the filler is adhered so as to completely encapsulate the seed and provide an integral flowable product. To this end, the binder should preferably be such that at ambient temperatures in its pure form, it initially has a sticky or tacky consistency but is capable of setting to a solid state when mixed with the filler, and when optionally subjected to a low temperature heat treatment. Suitable binders are gums such as gum arabic, starches, lignasite (a tree sap residue produced as a by-product in paper making), and molasses. Molasses is particularly preferred. This is the thick liquid left after sucrose has been removed from the mother liquor in sugar manufacture. Molasses is also a common feedstock supplement and is available from the sugar industry in large amounts.

The filler is primarily provided to make the feedstuff flowable. A secondary purpose is as a nutrient provider. Suitable fillers are inert mineral powders such as calcium carbonate, lime, diatomaceous earth, forms of clay such as bentonite and kaolin, extruded or textured proteins such as those derived from soybeans, and ground cereal grains such as corn, wheat, barley, maize and sorghum. Mixture of these and other fillers are also useful. The most preferred filler is bentonite, which is a colloidal clay commonly used as a food additive and which is readily available, and mixtures of bentonite with lime and diatomaceous earth.

As mentioned above, other additives can also be included in the coating. These additives may comprise, vitamins, minerals, trace elements, veterinarian products for the prevention, control or eradication of disease, growth stimulating factors, and the like.

On a weight basis, the percentage of filler will preferably be within the range of 5-50%, most preferably about 40%. The percentage of binder will preferably be within the range 1-10%, most preferably about 5%, and the balance being the fluffy cotton seed and any additives which happen to be required. Such additives will not generally comprise more than about 5% of the total feedstuff and will most preferably be present in an amount of about 1%.

The feedstuff has particular suitability as a ruminant feedstuff supplement.

The feedstuff may be prepared by optionally partially delinting the raw fluffy cotton seed by flame treatment followed by charcoal removal, blending the seed with a slurry of the binder and filler in a rotating chamber. Then passing the coated seeds through a drier wherein the coating is set to a solid mass. The product can then be stored in bulk or bagged as appropriate.

The feedstuff thus prepared is highly nutritive and has excellent flow characteristics making it suitable for bulk handling.

BRIEF DESCRIPTION OF THE DRAWING

The drawing is a schematic flow diagram of equipment used for coating seeds according to the present invention.

DESCRIPTION OF PREFERRED EMBODIMENTS

Preferred embodiments of the feedstuff are described in the following examples:

EXAMPLE 1

Fluffy cotton seed was charged to a rotating chamber in a metered amount from a storage hopper. Molasses and bentonite from bulk storage containers were metered into the rotating chamber in amounts to provide approximately 5% by weight of molasses and approximately 40% by weight of bentonite. Rotation was continued until the fluffy cotton seed was completely coated. The coated seed was then deposited on a conveyor and transported to a drier where it was dried by blasting with hot air.

The feedstuff thus formed had the consistency of a relatively hard but easily chewable pellet which was most acceptable and readily consumed by the cattle to which it was fed.

The feedstuff, furthermore, could be easily handled and did not have any undesirable flow characteristics.

EXAMPLE 2

Fluffy cotton seed 9 was distributed from an overhead bin 10 with a live floor 11 evenly across a flame delinting bed 12. As the fluffy cotton seed was transported down the bed, the bed was vibrated to cause the seed to undergo a tumbling action. During such tumbling action the seed successively passed a number of gas flames 13 which singed the adherent fluffy cotton, reducing the amount of cotton by about 40-50%. The flame delinted seed was then transported to a buffing trommel 14 which abrasively removed the charcoal 15 from it.

The partially delinted seed 16 was charged to a rotating chamber 17. Molasses 18; bentonite, lime and diatomaceous earth 19 were metered into the chamber to provide approximately 5% by weight of molasses, approximately 3% by weight of bentonite, 3% by weight of lime and 3% by weight of diatomaceous earth. Rotation was continued until the fluffy cotton seed was completely coated. The coated seed 20 was then transported to a drier 21 and dried with hot air prior to bagging 22.

The resultant feedstuff had the following nutrient specification (on a dry basis):

| | |
|---|---|
| Metabolic Energy (Ruminant) | 11–12 MJ/Kg |
| Nitrogen Free Extractives | 25–30% |
| Protein | 18–22% |
| Fat | 18–22% |
| Ash | 8–12% |
| Moisture | 6–12% |

It was a chewable pellet of high nutritive value which was readily acceptable by the cattle to which it was fed.

Whilst the above has been given by way of illustrative example only, many modifications and variations may be made thereto by persons skilled in the art without departing from the broad scope and ambit of the invention as herein set forth.

We claim:

1. An animal feedstuff comprising fluffy cotton seed coated with a binder and a filler.

2. An animal feedstuff as claimed in claim 1 in which the filler comprises 10–50% by weight of the total weight of the coated seed, and the binder comprises 1–10% by weight of the total weight of the coated seed.

3. An animal feedstuff as claimed in claim 2 in which the filler comprises about 40% by weight, and the binder about 5% by weight.

4. An animal feedstuff as claimed in claim 1 in which the binder is molasses; the filler is selected from the group consisting of calcium carbonate, diatomaceous earth, bentonite, lime, kaolin, extruded and textured proteins, ground cereal grains and mixtures thereof.

5. An animal feedstuff as claimed in claim 1 in which the fluffy cotton seed has been partially delinted by singeing in a flame prior to being coated.

6. An animal feedstuff as claimed in claim 5 in which the charcoal formed upon singeing the fluffy cotton seed has been abrasively removed by buffing.

7. An animal feedstuff as claimed in claim 5 in which the filler comprises 10–50% by weight of the total weight of the coated seed, and the binder comprises 1–10% by weight of the total weight of the coated seed.

8. An animal feedstuff as claimed in claim 5 in which the filler comprises about 40% by weight, and the binder about 5% by weight.

9. An animal feedstuff as claimed in claim 5 in which the binder is molasses; and the filler is selected from the group consisting of calcium carbonate, diatomaceous earth, bentonite, lime, kaolin, extruded and textured proteins, ground cereal grains and mixtures thereof.

10. An animal feedstuff as claimed in claim 1 or claim 5 which comprises about 5% by weight of molasses and about 40% by weight of bentonite, the balance being fluffy cotton seed.

11. An animal feedstuff as claimed in claim 1 and further including an animal maintenance additive.

12. An animal feedstuff as claimed in claim 11 wherein said animal maintenance additive comprises up to 5% by weight of the total weight of the seed.

13. An animal feedstuff as claimed in claim 11 wherein said animal maintenance additive is selected form the group consisting of vitamins, minerals, trace elements, veterinarian products for the prevention, control or eradication of disease, and growth stimulating factors.

14. An animal feedstuff as claimed in claim 11 in which the filler comprises 10–50% by weight of ht total weight of the coated seed, the binder comprises 1–10% by weight of the total weight of the coated seed, and the additive comprises up to 5% by weight of the total weight of the coated seed.

15. An animal feedstuff as claimed in claim 14 in which the filler comprises about 40% by weight of the total weight of the coated seed, and the binder about 5% by weight of the total weight of the coated seed.

16. An animal feedstuff as claimed in claim 11 in which the binder is molasses; the filler is selected from the group consisting of calcium carbonate, diatomaceous earth, bentonite, lime, kaolin, extruded and textured proteins, ground cereal grains and mixtures thereof; and the animal maintenance additive is selected from the group consisting of vitamins, minerals, trace elements, veterinarian products for the prevention, control or eradication of disease, and growth stimulating factors.

17. An animal feedstuff as claimed in claim 11 in which the fluffy cotton seed has been partially delinted by singeing in a flame prior to being coated.

18. An animal feedstuff as claimed in claim 17 in which the charcoal formed upon singeing the fluffy cotton seed has been abrasively removed by buffing.

19. An animal feedstuff as claimed in claim 17 in which the filler comprising 10–50% by weight of the total weight of the coated seed, and the binder comprises 1–10% by weight of the total weight of the coated seed, and the additive comprises up to 5% by weight of the total weight of the coated seed.

20. An animal feedstuff as claimed in claim 17 in which the filler comprises about 40% by weigh to the total weight of the coated seed, and the binder about 5% by weight of the total weight of the coated seed.

21. An animal feedstuff as claimed in claim 17 in which the binder is molasses; the filler is selected form the group consisting of calcium carbonate, diatomaceous earth, bentonite, lime, kaolin, extruded and textured proteins, ground cereal grains and mixtures thereof; and the animal maintenance additive is selected form the group consisting of vitamins, minerals, trace elements, veterinarian products for the prevent, control or eradication of disease, and growth stimulating factors.

22. An animal feedstuff as claimed in claim 17 which comprises about 5% by weight of molasses and about 40% by weight of bentonite, the balance being fluffy cotton seed.

* * * * *